Nov. 17, 1970  E. RUSS  3,540,312
INDEXING FIXTURE AND METHOD OF INDEXING
Filed March 14, 1969
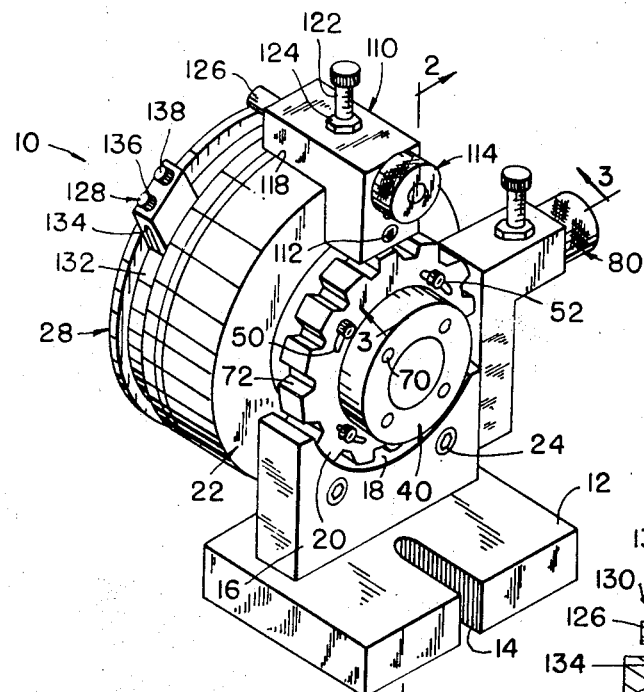
INVENTOR.
EDWIN RUSS
BY
ATTORNEYS Patented Nov. 17, 1970

3,540,312
INDEXING FIXTURE AND METHOD OF
INDEXING
Edwin Russ, 27736 Palmer Lane,
Madison Heights, Mich. 48071
Filed Mar. 14, 1969, Ser. No. 807,393
Int. Cl. B23q *17/18*
U.S. Cl. 74—813                              11 Claims

ABSTRACT OF THE DISCLOSURE

A holder with an index structure is journaled for rotation in a support member. An index pin is slidably and rotatably mounted on the support member. The index pin extends out of a bore. A cam surface is provided on the index pin to frictionally engage the end of a screw which projects into the bore. The index structure includes a series of peripherally spaced indexing structures, preferably notches, for engagement with the forward portion of the pin for indexing the holder to different positions.

In the method of indexing, the index pin has a curved nose which engages notches in the index structure. The notches have V-shaped sidewalls which make contact with the curved nose of the pin. As the pin is turned to engage the camming structure, the nose wipes the notch surfaces clean to thereby accurately index the holder.

BACKGROUND OF THE INVENTION

The invention is primarily concerned with indexing of work holding devices although it may be used to index a tool holding device such as a clamp or vise-like element. The work holding device is indexed to various positions during machine operations on the work. Various indexing devices have been proposed in the past. One of the previous indexing devices has involved the use of an index pin which is threaded and received in a threaded opening. Notches were provided on an indexing disc which rotated with the work holder. The index pin is threaded into and out of different notches to index the work holder in angularly adjusted positions.

The disadvantage of such a structure is that the pin is not positively seated with respect to the device because of the clearance between the threads of the pin and the internal threads of the opening in which it is received. This may result in vibration of the work holder with respect to the support structure on which it is mounted. As will be appreciated, this leads to inaccuracies in the machining operation.

Another problem with such indexing structures is that a speck of dirt may be deposited on the surface of the notch in the indexing disc. The speck of dirt will cause a misalignment with resultant inaccurate machining on the part which is being machined. Further, the manipulation of such indexing means is time-consuming and laborious.

The present invention provides an indexing structure wherein the index pin has a cam surface thereon which frictionally engages cam-engaging means after turning of the pin to thereby hold the pin firmly in place and thus avoid vibration thereof. The pin may be easily and quickly engaged or disengaged because the operation merely involves inserting the pin into or out of the notches in the indexing disc and then turning the pin about one-half turn. A further advantage of the invention resides in the fact that the nose of the pin, which has a curved or ogive shape, wipes the surface of the notch as it is being turned to engage the cam structure. This wiping action dislodges any dirt particles which may be on the cam surface to thus result in accurate positioning of the index disc and associated work holder.

SUMMARY OF THE INVENTION

Indexing means are provided for a device wherein a holder is journaled for rotation in a support member. The indexing means comprise an index structure fixed to the holder. An index pin support structure is fixed to the support member. The index pin support structure has a bore therethrough. An index pin is slidably and rotatably received in the bore. A forward portion of the index pin extends out of the bore when the pin is slid into the bore. A cam surface is provided on the pin. Cam engaging means extend into the bore for frictional engagement with the cam surface when the pin is turned in one direction to hold the pin in position. The index structure further includes a series of peripherally spaced indexing structures, preferably notches, for engagement with the forward portion of the pin to hold the index structure and holder against rotation whereby the holder may be indexed to various stations by engaging and disengaging the index pin from the indexing structure.

In the method of indexing, the nose of the index pin is first inserted into a notch in contact with the side surfaces of the notch. The pin is then turned to simultaneously wipe the thus contacted notch surfaces clean with the pin nose and simultaneously frictionally engage the cam device to hold the pin in place.

In the drawing:

FIG. 1 is a view in perspective of one embodiment of the indexing fixture of the present invention;

FIG. 2 is a sectional view taken substantially along the line 2—2 of FIG. 1 looking in the direction of the arrows;

FIG. 3 is a sectional view taken substantially along the line 3—3 of FIG. 1 looking in the direction of the arrows;

FIG. 4 is a sectional view taken substantially along the line 4—4 of FIG. 3 looking in the direction of the arrows illustrating the index pin in the disengaged position; and FIG. 5 is a view similar to FIG. 4 illustrating the index pin in the engaged position.

Referring to the figures, the indexing fixture 10 comprises a base 12 which has a slot 14 to accommodate bolts or the like for fastening the base 12 to a support. An upstanding support structure 16 is welded to the base at substantially the center thereof. The support structure 16 extends across the base, the base and support structure together forming a T-shaped member. An arcuate recess 18 is provided in the upper portion of the support structure 16 to rotatably receive an index plate 20 and associated structure.

A support ring element 22 is fixedly secured to the support structure 16 on the forward face thereof by means of machine screws 24. An annular bearing race 26 is provided in the forward face of the ring element 22. A rotatable face plate 28 is supported in front of the ring element 22. The face plate 28 has an annular bearing race 30 in alignment with the race 26. A plurality of ball bearings 32 are received in the races to provide a bearing structure between the ring element 22 and face plate 28 for smooth rotation of the face plate with respect to the ring element.

An annular band 34 of felt or other similar fibrous material is provided around the periphery of the juncture of the face plate 28 and ring element 22 to prevent the escape of oil from the bearing structure. The band 34 is held in place by means of a metallic band 36 which is press-fitted onto the ring element 22. It will be noted that the band 36 does not extend substantially beyond the ring element 22 to thus avoid any frictional drag which might be engendered thereby. The forward face 38 of the face plate 28 is adapted to receive a tool or work holder such as a chuck or the like.

The index plate 20 is rotatably mounted on the rearwide side of the fixture 10. The index plate 20 is mounted on a hub structure 40. The hub structure 40 comprises a first rearwardly extending hub portion 42, a central peripheral flange 44, and a forwardly extending hub portion 46. A central bore 48 is provided in the hub structure 40.

The index plate 20, which is an annular member, is received on the rearward hub portion 42 in abutment with the rear face of the flange 44. A plurality of spaced apart slots 50 are provided in the index plate 20. Screws 52 extend through the slots 50 into threading engagement with threaded openings provided in the flange 44. The slots 50 permit angular adjustment of the index plate 20 with respect to the hub structure 40.

The support ring element 22 is provided with recess structure for the reception of the hub structure 40 and a bearing structure. The recess structure comprises a first recess portion 54 which terminates adjacent to the forward portion of the ring element 22 to thereby define an annular wall 56. A second recess portion 58 of larger diameter extends from the recess portion 54 to the outer face of the ring element. A bearing collar 60 is received in the recess portion 54. The collar 60 is spaced from the face of the wall 56 by means of screws 62. These screws permit axial adjustment of the collar 60. A ball bearing retainer structure 64 containing a plurality of ball bearings 66 is received within the recess portion 54. The ball bearings 66 engage the rearward face of the collar 60 which functions as a bearing race. The forward hub portion 46 of the hub structure 40 extends through the retainer 64 and collar 60 into abutment with an annular flange 68 of the face plate 28. A plurality of screws 70 extend through openings provided in the hub structure 40 into threaded engagement with threaded openings provided in the flange 68 to thereby secure the hub structure 40 and face plate 28 together for simultaneous rotation. The forward face of the hub flange 44 engages the ball bearings 66 and thereby functions as a bearing race.

From the structure thus far described, it will be appreciated that the face plate 28 and hub structure 40, which carries the index plate 20, rotate as a unit. The ball bearings 32 and races 26, 30 provide vertical bearing support for the structure while the ball bearings 66 function as pressure bearings in the axial direction and thereby result in a bearing support which causes smooth movement of the index plate 20 and face plate 28 while at the same time resulting in accurate, concentric movement thereof about the central axis of the device.

The index plate 20 and associated index means will now be described. The index plate 20 is provided with a plurality of notches 72 on the outer periphery thereof. The notches 72 may, illustratively, be twenty-four notches equally spaced around the index plate. This results in an angle of 15 degrees between each pair of adjacent notches. Other arrangements may be used as desired or needed for a particular job. However, the arrangement shown permits the majority of machining operations to be accomplished.

The notches have a V-shape with converging surfaces 74, 76 interconnected by a bottom surface 78. This particular configuration is desirable from the standpoint of symmetry in that the V-shape results in engagement with the index pin 80 resulting in self-centering of the plate 20 and any wear of the surfaces 74, 76 tends to be uniform, thereby retaining the accuracy of the device. Further, as either the surfaces 74, 76, or the nose 82 of the pin 80 wear, the pin may be inserted further into the notches for engagement with deeper portions of the surfaces while still maintaining the self-centering feature to thus result in an accurate locking action.

The index pin 80 is slidably received in a bore 84 provided in the horizontal leg 88 of a support block 86. A lower portion of the vertical leg 90 abuts against the side of the support structure 16 and is secured thereto by means of screws 92. The upper portion of the vertical leg 90 extends upwardly from the structure 16 and is substantially parallel to a theoretical plane which is tangential to the index plate 20. The longitudinal axis of the bore 84 is thus directed in a line which passes radially through the center of the circle defined by the index plate 20. This relationship is of importance in exactly aligning the nose 82 of the pin 80 with adjacent notches 72.

The index pin 80 is provided with an enlarged head 94 for manual manipulation of the pin. A cam portion 96 is provided on the pin 80 intermediate the ends thereof. The cam portion 96 is formed in the pin by machining the pin and results in a recess or depression in the pin. Referring to FIG. 4, the portion 96 extends for approximately 180 degrees. At its deepest point 98 it may be, for example, .008 to .012 of an inch deep. The cam surface then gradually extends radially outwardly and blends into the outer periphery of the pin at 100. A threaded opening 102 is provided in the leg 88 in alignment with the cam portion 96 when the pin 80 is inserted into the bore 84. A screw 104 is threadingly received in the opening 102. The screw 104 is provided with a lock nut 106. The screw 104 may be adjusted to the desired depth for contact with the cam portion 96. It is then locked in place by means of the nut 106.

In operation of the indexing fixture 10, the index plate 20 is rotated to the desired position. The pin 80, which is at this time out of engagement with the end of the screw 104, as illustrated in FIG. 4, is then slid axially in the bore 84 whereby the nose 82 will enter the adjacent notch 72. The nose, illustratively, has an ogive shape. Conceivably, a spherical or other curved shape could also be used. Upon entering the notch 72, the nose 82 will contact one or the other of the surfaces 74, 76 causing the index plate 20 to be shifted slightly into exact alignment with the pin 80 to thus accurately position the index plate. After the pin has been inserted into the notch 72, it is turned clockwise, as viewed in FIG. 4, until the end 108 of the screw 104 makes contact with the cam surface 96 (FIG. 5). The wedging contact which results firmly holds the pin 80 in place.

It will thus be appreciated that the action necessary to adjust and lock the index plate 20 in the desired position is a simple and fast method of indexing. The pin 80 may be pulled back and forth in the bore 84 quite quickly and locked and unlocked in the desired position with a minimum of effort, namely, about one-half turn of the pin. The locking action of the index plate is positive, somewhat similar to having a pin which is press-fitted. This eliminates vibration of the indexing fixture 10. Relative vibration of a pin which is not press-fitted will always occur because of the clearance between the pin and the hole. A further advantage of the method of locking the index plate is that the nose 82 rubs against the notch surfaces 74, 76 as the pin is turned to engage the end 108 of the screw 104. This rubbing action is highly desirable because it causes any dirt between the nose 82 and notch surfaces to be wiped out. The index plate is consequently locked in an accurate position.

An auxiliary indexing mechanism employing the concept of the latching pin 80 and associated structure is also provided. Referring to FIGS. 1 and 2, it will be noted that an L-shaped block 110 is provided on the top of the ring element 22. The block 110 is held in place by means of screws 112. An index pin 114 is received in a bore 116 provided in leg 118 of the block 110. The pin 114 has a cam portion 120 constructed as in the manner of the cam portion 96 of pin 80. A screw 122 having a lock-nut 124 is threadingly received in a threaded opening of the leg 118 for engagement with the cam portion 120 as previously described in connection with the pin 80.

A portion 126 of the pin 114 extends forwardly of the leg 118. A pair of adjustable stops 128, 130 are provided in an annular recess 132 of the periphery of the face plate 28. The stops 128, 130 each have a central slot 134 which extends from the bottom thereof to a point short of the top thereof. A pair of screws 136, 138 are threadingly received in openings provided in the stops. The openings are in alignment with the slot 134. The stops may be adjusted by unthreading the screws 136, 138 whereupon the lower portion of the stops will diminish in thickness as the result of the spring action inherent therein. The stops may then be moved to a position in the recess 132 as desired. When the screws 136, 138 are again threaded into the stops, the lower portion of the stops spreads apart into frictional contact with the sidewalls of the recess 132 to frictionally maintain the stop in position.

In operation, the stops 128, 130 are positioned at the desired angular relationship. The index plate 20 and face plate 28 are then rotated until one of the stops engages the forward portion 126 of the pin 114. The machining operation is then accomplished. After the machining operation, the pin 114 is rotated out of engagement with the screw 122 and pulled outwardly to permit passage of the previously engaged stop. After the stop has passed thereby, the pin is again thrust forwardly and turned into camming engagement with the screw 122. The indexing device is then further rotated until the next stop engages the forward portion 126 of the pin whereupon the machining operation is accomplished and the cycle is completed. More than two stops may be provided. The stops are generally used as an indexing system separate from the index plate 20. However, they may be used in conjunction with use of the index plate 20.

What I claim as my invention is:

1. Indexing means for a device wherein a holder is journaled for rotation in a support member, comprising an index structure fixed to the holder, an index pin support structure fixed to said support member, said index pin support structure having a bore therethrough, an index pin slidably and rotatably received in said bore, a forward portion of said index pin extending out of the bore when the pin is slid into the bore, a cam surface on said pin, cam engaging means extending into the bore for frictional engagement with said cam surface when said pin is turned in one direction to hold the pin in position, and said index structure including a series of peripherally spaced indexing structures for engagement with the forward portion of the pin to hold the index structure and holder against rotation whereby the holder may be indexed to various stations by engaging and disengaging the index pin from the indexing structures.

2. Indexing means as defined in claim 1, and further characterized in that said series of peripherally spaced indexing structures comprise a plurality of notches in the index structure, the end of said pin being receivable in said notches for engagement therewith.

3. Indexing means as defined in clam 2, and further characterized in that the end of said pin has a curved shape.

4. Indexing means as defined in claim 3, and further characterized in that the curved shape is ogive.

5. Indexing means as defined in claim 3, and further characterized in that the side walls of said notches converge radially inwardly to define a V-shape.

6. Indexing means as defined in claim 1, and further characterized in that said cam surface is formed in said pin to define a recess, the cam surface curving from a relatively deep point in the pin to merge with the outer periphery of the pin.

7. Indexing means as defined in claim 6, and further characterized in that said cam surface extends for approximately 180 degrees around the pin.

8. Indexing means as defined in claim 6, and further characterized in that said cam engaging means comprises a threaded element, said index pin support structure having a threaded opening therein threadingly receiving said threaded element whereby said threaded element may be adjusted to a position wherein the inner end thereof will frictionally engage a point on said cam surface, and a lock nut on said threaded element to lock said threaded element in the adjusted position.

9. Indexing means as defined in claim 1, and further characterized in that said indexing structure comprises stops for abutting engagement with the forward portion of the pin, said stops being releasably secured to the index structure for peripheral adjustment to different positions.

10. The method of indexing a rotatable holder having an index structure fixed thereto and wherein the index structure has a series of peripherally spaced notches comprising the steps of rotating the holder and index structure to the desired position, inserting the nose of an index pin into one of the notches into contact with the side surfaces thereof, turning the pin to wipe the thus contacted notch surfaces clean with the pin nose and simultaneously frictionally engaging a cam device to hold the pin in place.

11. The method as defined in claim 10, and further characterized in the step of forming the notches in a V-shape and forming the nose of the pin in a symmetrical curved shape, and aligning the index structure with respect to the pin axis by inserting the pin nose into the notch until both of the side surfaces forming the notch are contacted by the nose.

References Cited

UNITED STATES PATENTS

| | | | |
|---|---|---|---|
| 1,036,720 | 8/1912 | Robinson | 74—817 |
| 2,357,329 | 9/1944 | Hansen | 74—816 XR |

FRED C. MATTERN, Jr., Primary Examiner

F. D. SHOEMAKER, Assistant Examiner